United States Patent
Burns, Sr. et al.

(10) Patent No.: US 11,752,915 B1
(45) Date of Patent: Sep. 12, 2023

(54) DEBRIS COLLECTION AND TRANSPORT CART AND METHOD OF USING SAME

(71) Applicants: Richard S. Burns, Sr., Elkins Park, PA (US); Allen T. Burns, Jenkintown, PA (US)

(72) Inventors: Richard S. Burns, Sr., Elkins Park, PA (US); Allen T. Burns, Jenkintown, PA (US)

( * ) Notice: Subject to any disclaimer, the term of this patent is extended or adjusted under 35 U.S.C. 154(b) by 19 days.

(21) Appl. No.: 17/662,461

(22) Filed: May 9, 2022

(51) Int. Cl.
B65D 88/12 (2006.01)
B60P 1/50 (2006.01)
B60D 1/40 (2006.01)

(52) U.S. Cl.
CPC . *B60P 1/50* (2013.01); *B60D 1/40* (2013.01)

(58) Field of Classification Search
CPC ........ B65D 88/123; B62B 1/24; B65F 1/1473
See application file for complete search history.

(56) References Cited

U.S. PATENT DOCUMENTS

| | | | |
|---|---|---|---|
| 638,106 A | 11/1899 | Freed | |
| 1,145,740 A * | 7/1915 | Bashelier | B62B 1/24 298/2 |
| 2,189,079 A | 2/1940 | Mueller et al. | |
| 2,772,918 A | 12/1956 | Klinger | |
| 3,088,383 A | 5/1963 | Ekstrom | |
| 3,178,228 A * | 4/1965 | Gibson | B62B 1/24 298/5 |
| 4,434,996 A | 3/1984 | Wallace | |
| 4,645,405 A | 2/1987 | Cambiano | |
| 4,723,887 A | 2/1988 | Swain | |
| 4,943,118 A | 7/1990 | Davis | |
| 5,006,031 A | 4/1991 | Fossing et al. | |
| 5,297,911 A | 3/1994 | Powell | |
| 5,313,817 A * | 5/1994 | Meinders | B62B 1/24 280/43.1 |
| 5,323,923 A | 6/1994 | Schauer | |
| 5,427,497 A | 6/1995 | Dillman | |
| 5,551,759 A | 9/1996 | Hoss et al. | |
| 7,077,404 B2 | 7/2006 | Groskreutz | |
| 7,950,687 B2 | 5/2011 | Ludlow | |
| 7,959,182 B2 | 6/2011 | Klein | |
| 8,172,248 B2 | 5/2012 | Groves | |
| 8,833,580 B2 | 9/2014 | Rogers | |

(Continued)

FOREIGN PATENT DOCUMENTS

AU 2010241311 A1 11/2010

*Primary Examiner* — Jonathan Snelting
(74) *Attorney, Agent, or Firm* — Saxton & Stump, LLC (57) ABSTRACT

An open top debris collection and transport cart with a hitch connector at a first end wall, a pair of wheels at an opposite second end wall, and a bottom panel connecting the end walls. The second end wall is outwardly angled from the bottom panel terminating in a top end, the wheels being positioned adjacent to the ground when the bottom panel is supported on the ground or when the bottom panel is rotated to a vertical orientation and the top end contacts the ground. An elevatable boom connectible to a work vehicle and having a mating hitch connector is provided. Elevating the boom slightly when the hitch is connected supports the cart by the wheels in contact with the ground surface allowing the work vehicle to move the cart. Further boom elevation rotates the bottom panel to a vertical orientation thus dumping the cart contents.

18 Claims, 8 Drawing Sheets

(56) References Cited

U.S. PATENT DOCUMENTS

| | | |
|---|---|---|
| 9,738,444 B1 | 8/2017 | Uffner et al. |
| D868,410 S | 11/2019 | Schwalbach |
| 10,625,935 B2 | 4/2020 | Raghunathan et al. |
| 10,836,415 B1 | 11/2020 | Morrow |
| 10,968,038 B2 * | 4/2021 | Hopkins ................. B65F 1/141 |
| 11,117,602 B2 * | 9/2021 | Green ....................... B62B 1/20 |
| 2007/0164526 A1 * | 7/2007 | Martini ..................... B62B 1/20 |
| | | 280/47.26 |
| 2012/0242051 A1 | 9/2012 | Lacasse |
| 2015/0123361 A1 | 5/2015 | Willett |
| 2016/0288995 A1 | 10/2016 | Bidelspach |
| 2017/0341860 A1 | 11/2017 | Dodds et al. |

* cited by examiner

DEBRIS COLLECTION AND TRANSPORT CART AND METHOD OF USING SAME

BACKGROUND OF THE INVENTION

The present invention relates to carts for receiving, classifying and transporting recyclable debris and a method for using such carts to process recyclable debris.

Material recycling centers generally include a receiving area where transport trucks off-load recyclable materials. Combined stream recycling which is commonly used in present-day recycling operations results in transport loads that may include many different material types, such as plastic, metal, cardboard, paper, glass, masonry, wood, and tires. The combined loads are dumped in the material receiving area. The recycling center must then identify, sort, temporarily store, and then batch bundle like materials for resale in the recyclable commodities market before economic value of the recyclable materials in the debris stream can be realized.

The economics of materials recycling require minimizing the number of times any individual commodity type or debris stream is handled, beginning from receiving and initial sorting, to packaging for shipment to a commodities market. In an ideal model, the initial classifying and sorting is accomplished in one pass through an incoming debris load with the respective recyclable materials removed from the stream and collected with like materials. The sorted and collected recyclable materials are then moved from the receiving area to a commodity batch storage area where they remain until a sufficient volume is collected to enable efficient bundling or baling to be accomplished.

In high volume operations where speed is necessary, self-propelled work vehicles with commodity bins may be used to move materials within the recycling center. In larger operations, wheeled loaders equipped with bucket scoops and/or grasping arms may be used to move materials within the recycling center. In the receiving area, this typically means positioning the work vehicle or loader so that like recyclable commodities from the incoming debris stream can be placed in the bucket for transport to the respective storage area in the facility for the various commodities. Multiple work vehicles or loaders may be required for incoming loads containing several different recyclable commodities. The process is extremely inefficient as it ties up self-propelled equipment and operators for the time necessary for personnel, perhaps using additional machines, to sort through the debris stream, identify particular recyclable commodities, and fill the waiting loader bucket(s) so that the sorted material can be removed from the receiving area and transferred to the commodity storage area. Smaller operations may not have the ability to dedicate a work vehicle or loader for each recyclable commodity type in the debris stream which results in the need to make multiple sorting passes through the incoming debris stream to gather commodity types in a serial manner.

Other recycling operations may rely on easily moveable, but non-propelled bins into which the sorted materials may be deposited once separated from the incoming debris stream. Bins that may be easily moved by a small work vehicle, such as a forklift, are generally limited in size to avoid overloading. Self-supporting wheeled bins that are towable by a work vehicle must somehow be made immovable during the loading process, preferably without requiring an operator to exit the relative safety of the utility vehicle to actuate parking brakes on a wheeled bin. Both the forklift bin and the wheeled bins pose problems when unloading into the commodity batch storage area as neither is easily repositioned (invented) to empty the contents.

Economic operation of recycling operations requires careful monitoring of the incoming mixed waste streams and precis accounting of the proportions of various recyclable commodities as well as waste with no commodity value contained therein. The task of monitoring an incoming waste stream delivered in tens if not hundreds of daily loads is more than may be effectively accomplished using known tracking processes.

What is needed is an improved method for efficiently receiving, classifying and transporting recyclable debris within a material recycling facility and a method for creating an accounting of the incoming debris and resultant recyclable commodity volume that overcomes these known limitations.

SUMMARY OF THE INVENTION

Accordingly, the present invention, in any of the embodiments described herein, may provide one or more of the following advantages:

It is an object of the present invention to provide a debris collection and transport cart having an open-top container having opposing first and second end walls connected by a bottom panel, a first hitch portion connected to an exterior surface of the first end wall, the second end wall be outwardly angled and terminating in a top end, and a pair of wheels externally mounted to the second end wall, an outer circumference of the pair of wheels being positioned adjacent to a horizontal surface when the bottom panel is supported on the horizontal surface, the outer circumference of the wheels being positioned adjacent to the horizontal surface when the top end of the second end wall portion is in contact with the horizontal surface and the bottom panel is vertically oriented, the cart being supported by the wheels in contact with the horizontal surface and the boom when the bottom panel is rotated from a horizontal orientation toward a vertical orientation.

It is also an object of the present invention to provide a debris collection and transport cart having an open-top container that is sized to accommodate recyclable materials of various densities to allow efficient collection, movement, and handling without the risk of exceeding weight capacities of the telehandler vehicles used to move and empty the carts. Carts with smaller containers may be provided for denser materials such as metals or masonry. Carts with larger containers may be provided for lighter materials such as cardboard or plastic.

It is a further object of the present invention to provide a debris collection and transport cart for use in receiving, classifying and transporting recyclable materials which includes a boom having a proximal end adapted for connection to an elevating apparatus on a work vehicle and distal end having a second hitch portion configured for selective connection to the first hitch portion, the cart being supported by the wheels in contact with the horizontal surface and the boom when the bottom panel is rotated from a horizontal orientation toward a vertical orientation thereby enabling the cart to be moved across the horizontal surface by the telehandler vehicle.

Another object of the present invention is to provide a debris collection and transport cart for use in receiving, classifying, and transporting recyclable materials that is easily transported and emptied using a work vehicle having an elevation apparatus. The boom connected hitch enables high-angle horizontal and vertical articulation for improved cart maneuverability across horizontal surfaces and, by elevating the boom by the telehandler, allows the cart bottom panel to be rotated from a horizontal orientation to a vertical orientation thereby allowing the material contained in the cart to be easily unloaded at a desired location, such as a batch staging area for like-kind recyclable materials.

It is yet another object of the present invention to a debris collection and transport cart for use in receiving, classifying, and transporting recyclable materials that is easily incorporated into an efficient material handling process. Multiple carts may be staged adjacent to a receiving area for recyclable debris. The debris stream can then be classified in a single operation and the sorted materials deposited directly into the adjacent carts with like materials until the entire load deposited in the receiving area has been classified and sorted. Carts that are filled may then be moved from the receiving area and transported to batch staging area for like recyclable materials and dumped. An empty cart can be positioned in the removed cart's place awaiting the next incoming load.

It is yet another object of the present invention to provide a method for monitoring movement of debris in a waste disposal and recycling facility that provides a controller receiving inputs for weight and type of incoming debris and sorted recyclable commodities, and associating those input with a unique tracking number. Indicia provided on debris carts used in sorting, segregating and transporting may be scanned and associated to the unique tracking number to track debris cart movement in the facility. Scales may be provided for weighing the debris carts and the weight information also associated by the controller with the unique tracking number.

It is a still further object of the present invention to provide a debris collection and transport cart for use in receiving, classifying, and transporting recyclable materials that is inexpensive of manufacture, ecologically sound, and simple and effective to use. The debris carts are economically fabricated and simple to use. The bottom panel rests on a horizontal surface when not being transported with the wheels positioned adjacent to, but not supporting the cart. The cart remains generally stationary on the horizontal surface with no action beyond positioning and disconnecting the boom and hitch from the cart. Moving the cart requires nothing more than to connect the boom and hitch, elevate the boom slightly with an elevating apparatus on the work vehicle so that the bottom is elevated and angled slightly above the horizontal surface, and moving the cart with the work vehicle.

These and other objects are achieved in accordance with the present invention by providing a debris collection and transport cart having an open-top container with a hitch connector at a first end wall, a pair of transport wheels at an opposite second end wall, and a bottom panel connecting the first and second end walls. The second end wall is outwardly angled from the bottom panel, terminating in a top end, the transport wheels being positioned adjacent to a horizontal surface when the bottom panel is supported on the horizontal surface, the outer circumference of the wheels being positioned adjacent to the horizontal surface when the top end of the second end wall is in contact with the horizontal surface and the bottom panel is vertically oriented. A boom having a proximal end adapted for connection to a telehandler vehicle and distal end having a hitch connector configured for mating connection to hitch connector on the first end wall is connectible to an elevating apparatus on a work vehicle. Elevating the boom slightly allows the cart to be supported by the wheels in contact with the horizontal surface thereby enabling the cart to be moved across the horizontal surface by the telehandler vehicle. Further elevation of the boom rotates the bottom panel to a vertical orientation, bring the top end into contact with the horizontal surface allowing the contents of the cart to be dumped.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 provides a view of the boom and hook connector for use with the debris cart of FIG. 1;

DESCRIPTION OF THE PREFERRED EMBODIMENT(S)

Many of the processes and other means and components utilized in this invention are widely known and used in the field of the invention described, and their exact nature or type is not necessary for an understanding and use of the invention by a person skilled in the art, and they will not therefore be discussed in significant detail. References to horizontal and vertical are made with respect to the invention resting on generally level ground. The various constituents of the composition shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Shown in the Figures is a first embodiment of a moveable debris cart 100. The debris cart includes an open-top container 110 defined by a bottom panel 112 with a wall 114 extending upwardly from and encircling a periphery 1122 of the bottom panel 112 and terminating in a top end 116. The bottom panel is generally planarly configured and rectangular in shape when viewed in plan. The planar configuration of the bottom panel allows it to remain stationary in a resting position on a substantially horizontal surface 200, such as the ground, when the cart is not engaged with a work vehicle 300 for transport. The 114 wall further comprises a first end wall 118 and a second end wall 119, the first and second end walls being opposingly disposed on the periphery 1122. The first and second end walls are connected by opposing first and second side walls 122, 123 which also extend upwardly from the bottom panel periphery and join the end walls to create a continuous wall extending from bottom panel periphery to create the open-top container structure.

The open-top container is preferably fabricated from steel plate. Steel plate having a 3/16-inch thickness has proven to offer an acceptable of strength and durability compared to the tare weight of the debris cart. Wall 114 may be joined to the bottom panel 112 by a welded connection or the like. The second end wall may be formed by bending the bottom panel to the desired angle or by joining flat plates at the desired angle. The top end 116 may be reinforced with stiffening members 1162 to stiffen the periphery of the top opening. The top end 120 of the second end wall 119 may include a reinforcement member 1202 to strengthen the second end wall top end 120 for better resistance to damage from contact with the ground while the cart is vertically oriented during dumping operations. In the example cart, the majority of the top end of the side walls and first end wall is reinforced with 1½ inch×3/16-inch square tube steel members connected by welding. The top end 120 of the second end wall 119 is reinforced with a 3-inch nominal diameter, schedule 80 steel pipe connected by welding and spanning the full extent of the top end portion 120 second end wall portion 119 to function as a bumper for added durability.

Side wall portions 122, 124 and first end wall portion 118 are preferably generally perpendicularly oriented in relation to bottom panel 112. Second end wall 119 is outwardly angled in relation to the bottom panel. In the example embodiment, the outward angle Θ of the second end wall portion 119 is 135 degrees from the bottom panel 112. The angle is selected to improve the ease with which container contents may be dumped by eliminating a square corner which could trap debris. It also allows easy positioning of the axle and connected wheels to accomplish the parking, transport, and dumping functions. While a nominal angle of 135 is preferred, the invention can be accomplished with as much as a +/−10 degree variation in the angle Θ.

A first hitch connector 128 is attached to an exterior surface 1182 of the first end wall portion 118 and laterally centered thereon. The first hitch connector is preferably one allowing hitching and unhitching operation to be conducted solely by repositioning a second hitch connector mounted at the distal end of a boom connected to a telehandler vehicle. In the example embodiment, the first hitch connector is a pintle loop that is connected to the exterior surface of the first end wall portion. The pintle connection is chosen for its flexibility as it permits rotation of the bottom panel through at least the 90-degree arc span from resting to dumping orientations without binding or limitation. Use of the open hook pintle portion does not create undue risk from accidental disconnection; cart movement will cease as the bottom panel drops to rest on the ground surface in the event the hitch end of the cart is dropped.

A pair of laterally spaced apart wheels 130 are attached to an exterior surface 1192 of the second end wall portion 119. Lateral spacing between each of the wheels 1302, 1304 should be generally symmetric in relation to the lateral width of the container. Lateral spacing between the wheels should be sufficient to provide stability when the carts are elevated into a transport position by lifting at the first hitch connector. The lateral spacing of the wheels is preferably at least 75% of the total width of the container with the wheels being laterally symmetrically positioned. In the example embodiment, the lateral spacing of the wheels is approximately one foot less than the nominal width of the cart.

Figure 1:
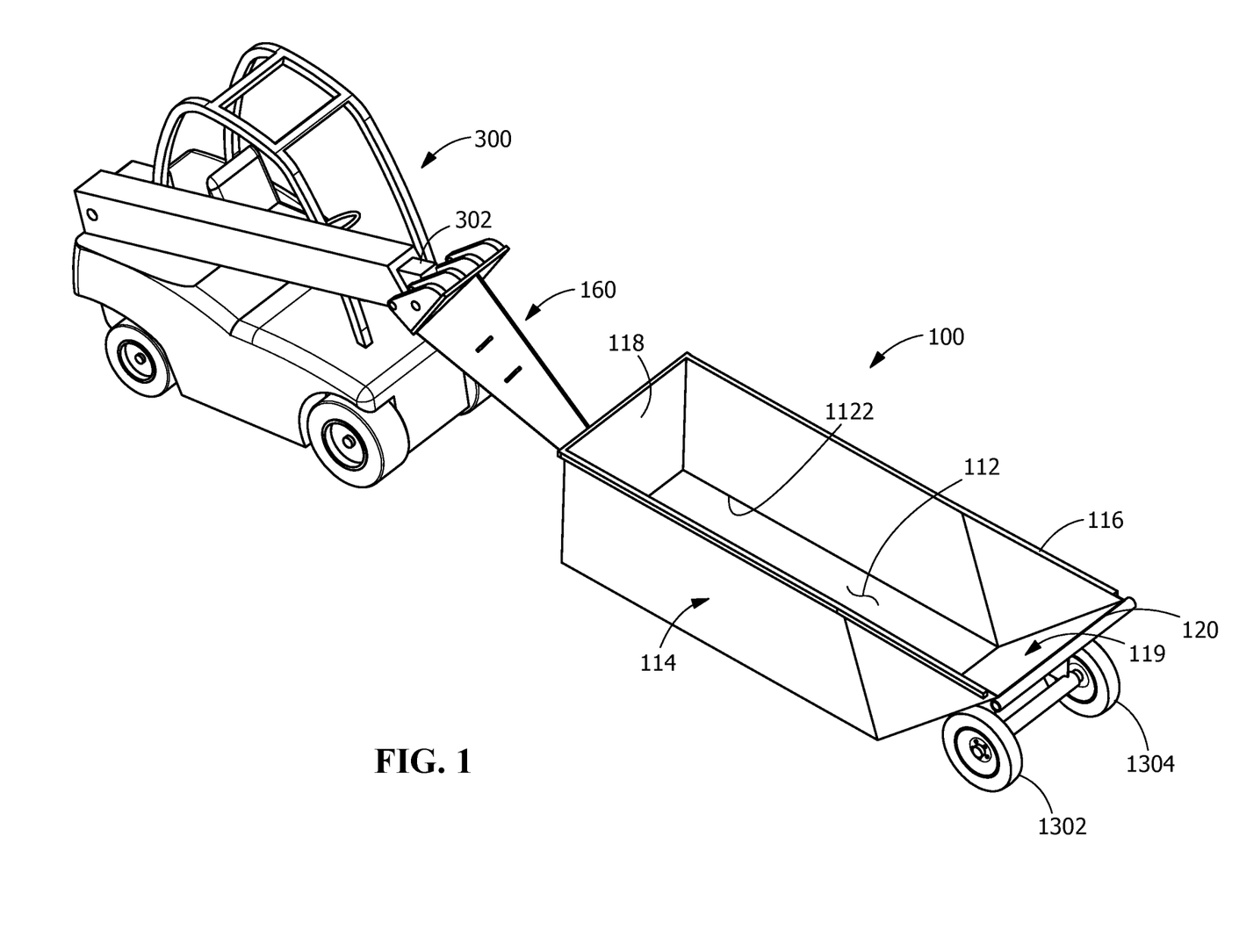
FIG. 1 provides a partial perspective view of a moveable debris cart embodying aspects of the present invention shown configured for movement by a work vehicle.
Figure 2:
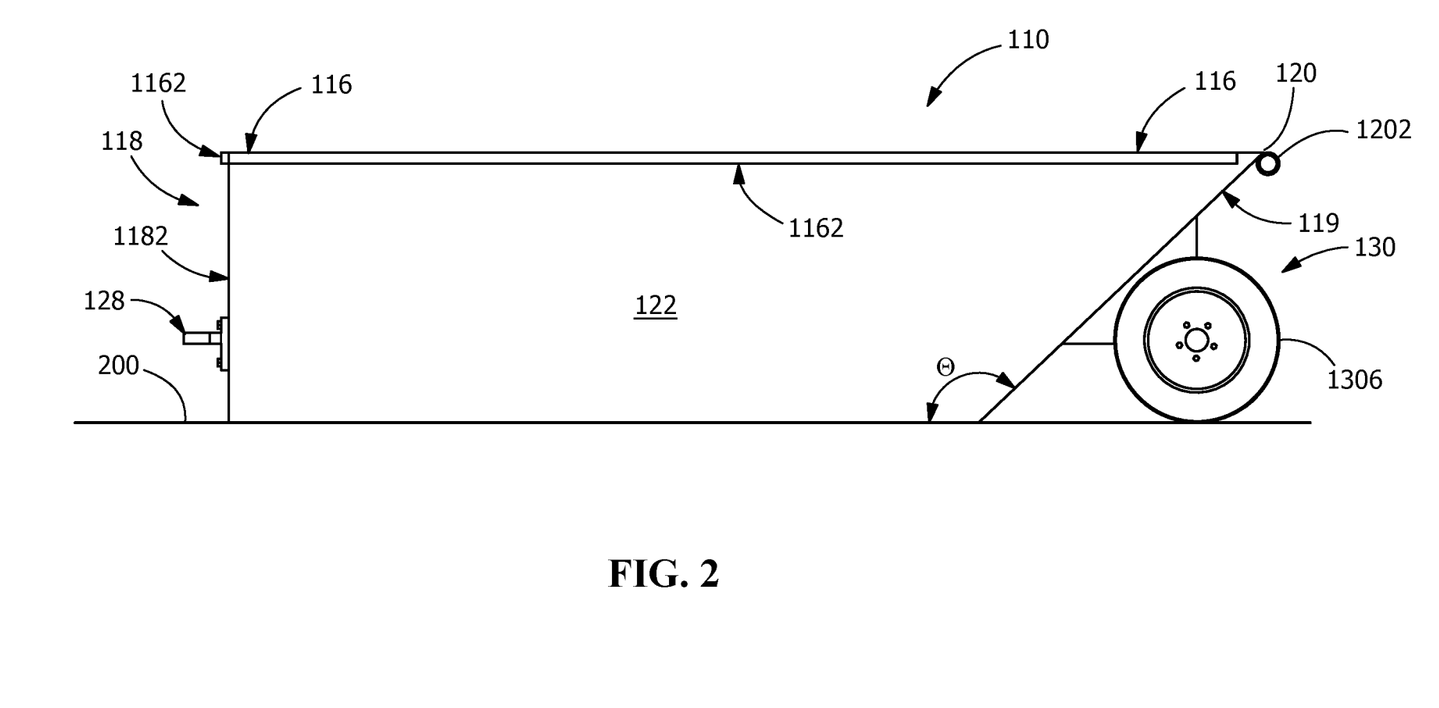
FIG. 2 provides a side elevation view of a debris cart incorporating aspects of the present invention shown in a resting position to receive material.
Figure 3:
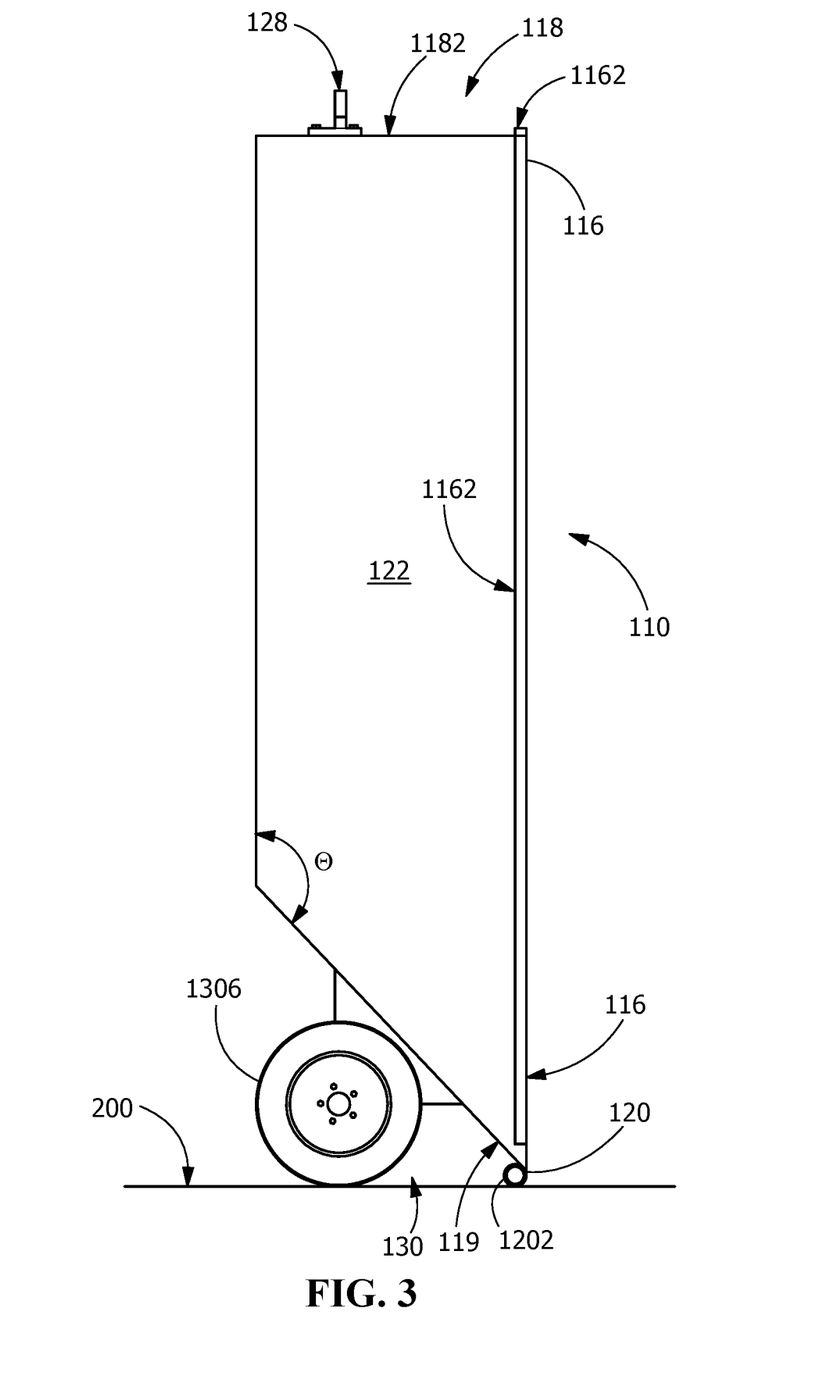
FIG. 3 provides a side view of a debris cart of FIG. 2 shown in a dumping position to discharge material.
Figure 4:
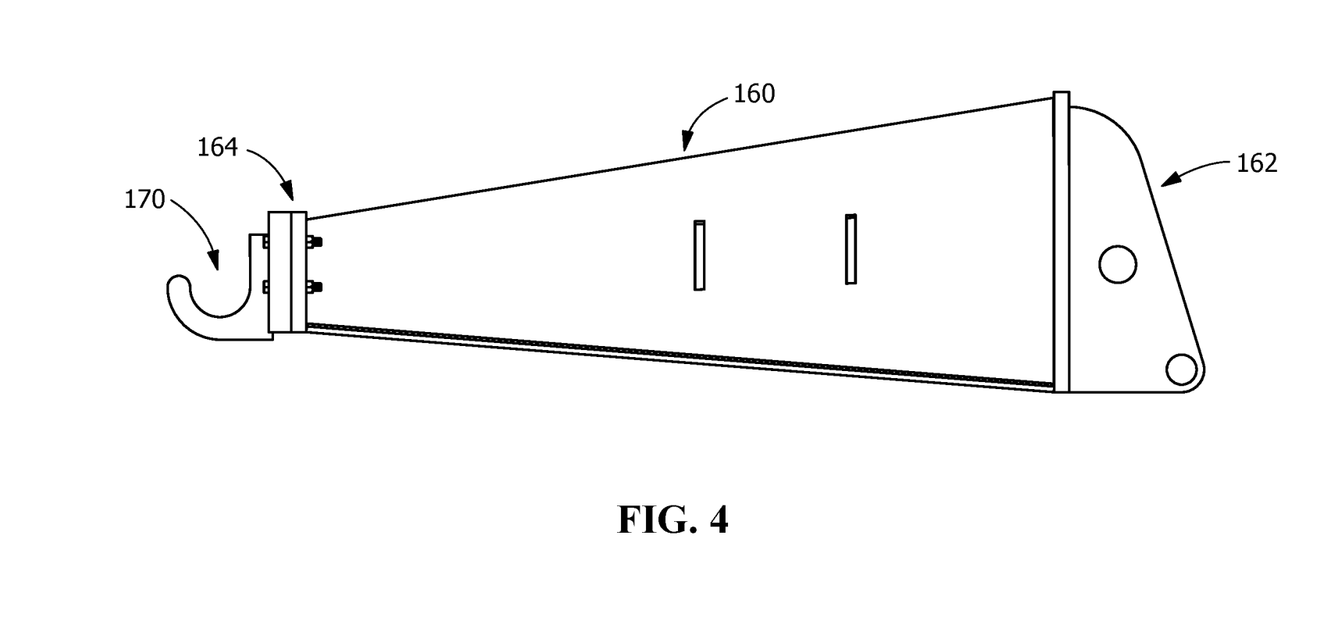
FIG. 4 provides an elevation view of the debris cart positioned in preparation for connection to and movement by a work vehicle.
Figure 5:
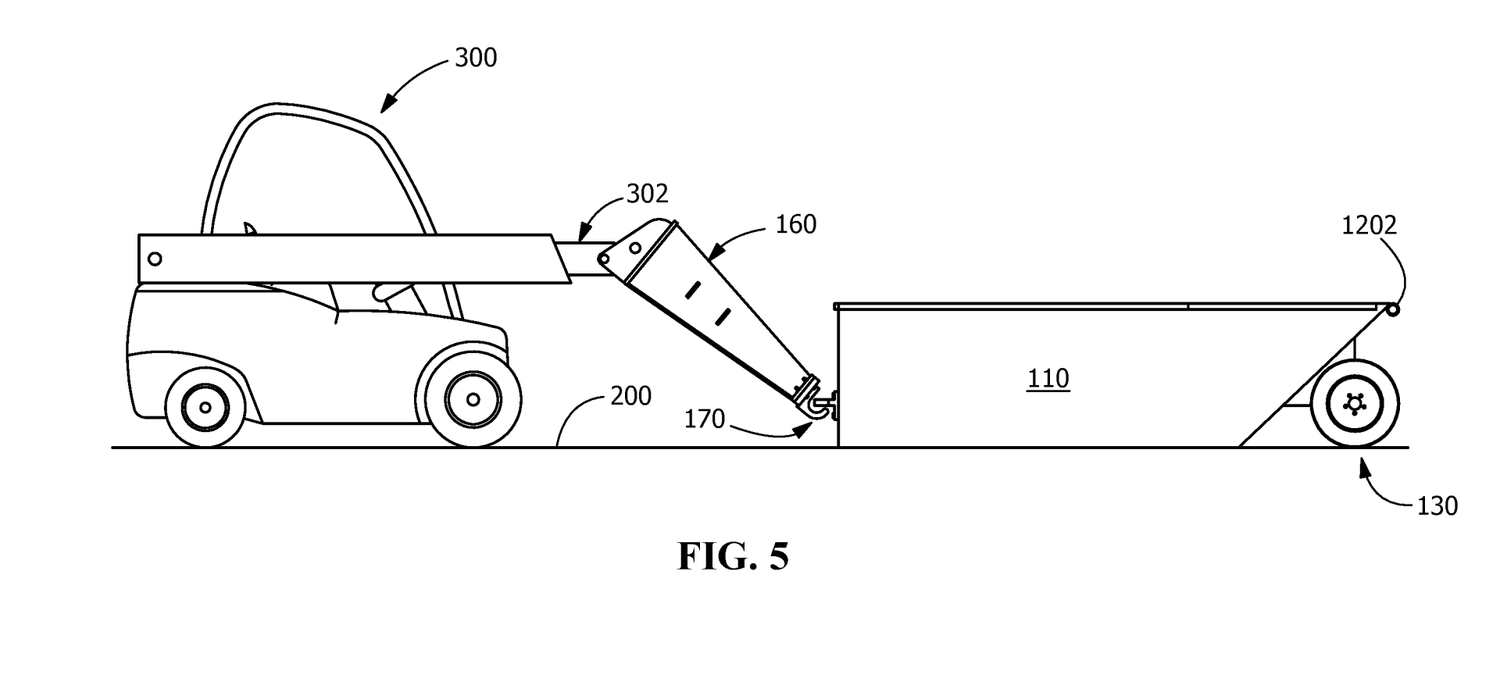
FIG. 5 provides an elevation view of the debris cart and work vehicle of FIG. 4, wherein the cart is in the resting position and work vehicle prepares to transport the cart.
Figure 6:
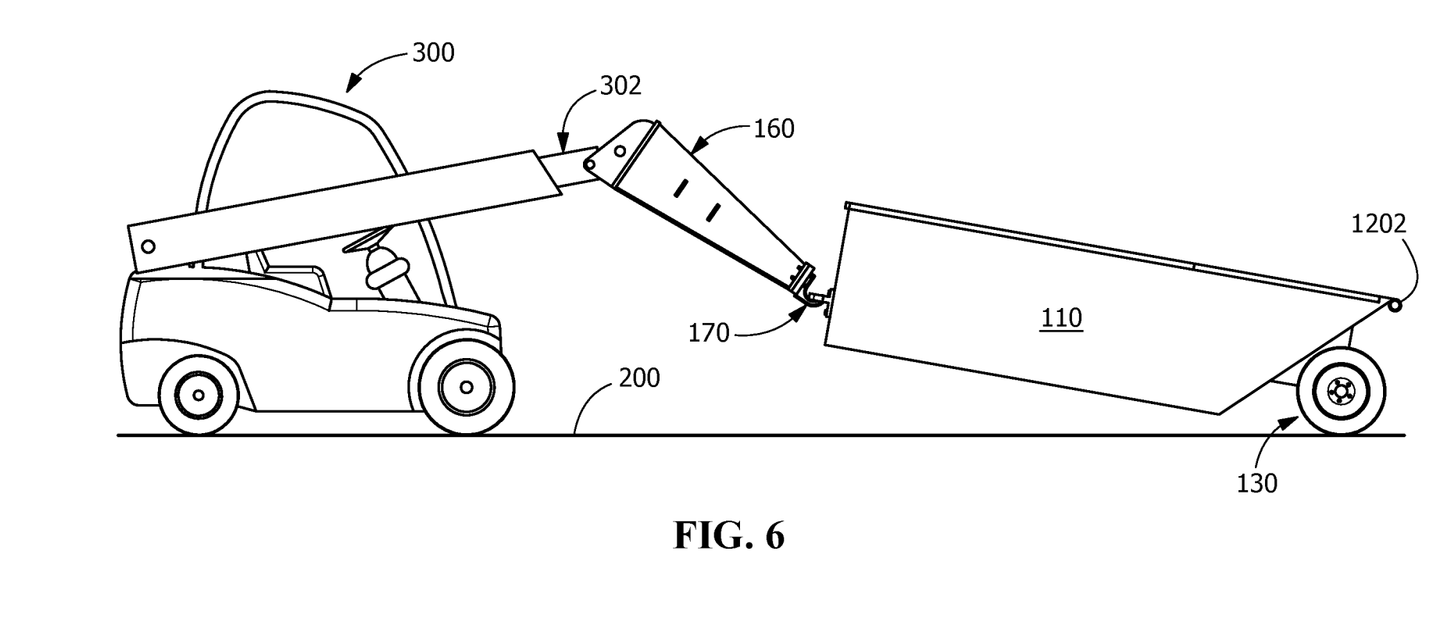
FIG. 6 provides an elevation view of the debris cart and work vehicle of FIG. 4, wherein the cart is in the transport position for movement by the work vehicle.
Figure 7:
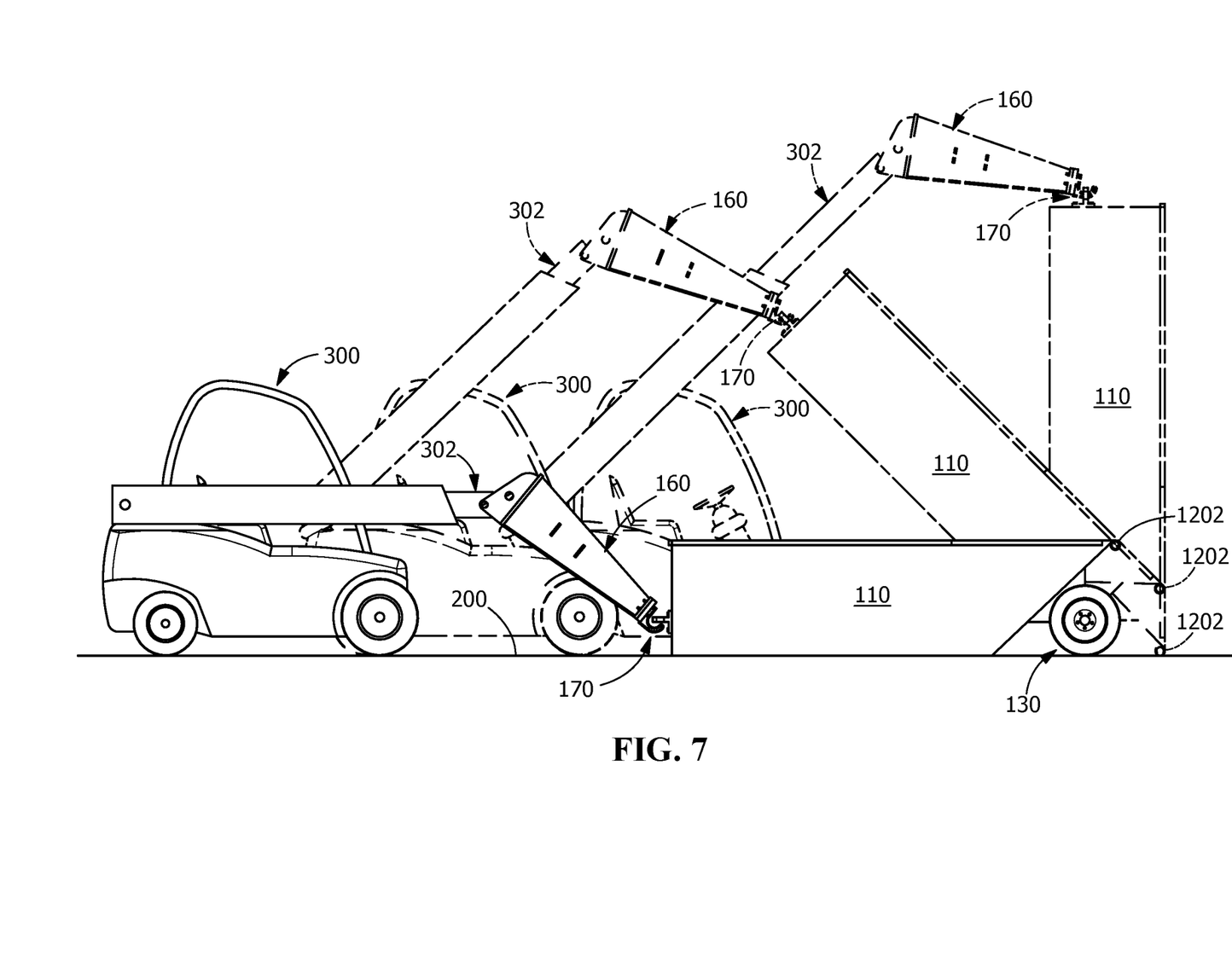
FIG. 7 illustrates a transport and dumping sequence for the debris cart using the boom and hook connector operably coupled to an elevating apparatus on a work vehicle.

Attachment of wheels 130 to the exterior surface 1192 of the second end wall portion 119 is configured to position an outer circumference 1306 of the wheels 130 so that may be used for moving the cart and to assist in rotating the cart to a dumping position in order to empty the contents thereof. To this end, the outer circumference 1306 is positioned to be adjacent to a substantially horizontal surface 200 when the cart bottom panel is resting upon the surface (FIG. 2) and when the cart is upended so that the bottom panel is oriented generally perpendicularly upward from the substantially horizontal surface (FIG. 3). The wheel position when the bottom panel is horizontally oriented allows the cart to rest stably and securely on the horizontal surface with minimal risk of unintended movement and without need for an operator to take any additional actions to secure the cart, such as setting a parking brake. As used herein, the term substantially horizontal surface is intended to mean ground surfaces upon which the cart may be parked or transported. The terms adjacent with respect to the relationship between the wheel outer circumference and the horizontal surface means the adjacent to and in contact with the surface, but not to the extent that the load borne on the wheels elevated the remainder of the container above the surface.

A hitch boom 160 is provided to allow selective connection of moveable debris cart 100 to a work vehicle 300. Hitch boom 160 includes a proximal end 162 adapted for connection to an elevating apparatus 302 on a work vehicle and distal end 164 having a second hitch portion 170 selectively connectible to the first hitch portion. A connector adapter 1622 is provided and configured to known standards for convenient coupling to a variety of work vehicles. Such adapters generally include one or more engagement structures, typically pins and hooks, which may be engaged and locked into position by couplers provided on the elevating apparatus of work vehicles. The hitch boom extends away from the work vehicle and terminates in a distal end to which is attached the second hitch portion. The extension of the hitch boom is preferred to be at least half of the width of the debris cart to for maximum lateral articulation, near 90 degrees, without interference between the debris cart container and the work vehicle. In the example embodiment, the second hitch portion 170 is a pintle hook that is easily engageable to the pintle loop provided on the cart. The orientation of the pintle hook allows the pintle loop to remain engaged on the hook, even as the debris cart is rotated to a vertical dumping orientation for emptying the contents yet remain easily disconnectable by slightly lowering of the second hitch portion until the cart is returned to the resting position when the cart bottom panel rests on a level surface.

The boom extension, approximately four feet in the example embodiment, positions the hitch connection from the utility vehicle sufficiently to enable high-angle horizontal and vertical articulation of the hitch connection without interference between the utility vehicle and the debris cart. The boom extension also allows limited swinging movement of the cart to occur when it is suspended vertically from the hitch connector in the dumping position without impacting the work vehicle.

The debris cart may be transported by the work vehicle when the boom is elevated by the work vehicle elevating apparatus to rotate the debris cart into the transport position. The hitch connection coupling at the distal end of the boom is connected to the debris cart, upward movement thereof elevating the hitch end of the debris cart. As the hitch coupling is elevated, the bottom panel is rotated from a horizontal orientation of the resting position toward a vertical orientation. Once the degree of bottom panel rotation reaches approximately 10 to 15 degrees above horizontal, the bottom panel is displaced from the substantially horizontal surface and the container becomes suspended between the hitch connection at one end and the wheels at the opposite end. This is referred to as the cart transport position. When the cart is in this position it can be moved by the work vehicle much like a conventional single axle trailer.

It is preferable to use a work vehicle having an elevating apparatus in the form of a telescoping lifting mast, the end of which may be elevated above the ground. Ideally, the telescoping mast should be capable of elevating hitch boom to a height at least equal to the length of the debris cart. While the hitch boom may be mounted to a conventional fork-lift style elevating apparatus on a work vehicle, work vehicles that include telescopically extendable masts are generally more compact for a given weight lifting capacity which improves maneuverability. One example work vehicle is the Model TLT 77-52D Teletruk material handling work vehicle manufactured by JCB Corporation. This Teletruk work vehicle elevating apparatus has a lift rating exceeding 7,000 pounds and can elevate the hitch boom over 14 feet from the ground.

The open-top container is sized to accommodate recyclable materials of various densities to allow efficient collection, movement, and handling without the risk of exceeding weight capacities of the debris cart of the work vehicles used to move and empty the carts. Carts with smaller containers may be provided for denser materials such as metals or masonry. Carts with larger containers may be provided for lighter materials such as cardboard or plastic. Prototype testing has been conducted with debris carts having nominal dimensions of four feet wide by approximately ten feet long are suitable for most recyclable materials commonly encountered. These prototypes are constructed with axles rated for 3,500 pounds which provides ample capacity for most material loads while limiting gross cart weight to safe working capacities of the work vehicles. Container widths of six feet and eight feet have also been tested and found to be better suited for less dense materials and/or bulky items such as cardboard and scrap aluminum extrusions.

The debris collection and transport cart may be integrated into a material handling process used in a waste recycling operation. Such operations may receive, sort, classify, and transport recyclable materials from an incoming waste stream to reclaim the economic value of the recycled commodity materials.

In one aspect of the method, deliveries of incoming mixed material waste or debris may be delivered into a receiving area where it may be classified, sorted, and segregated with like recyclable commodity types of material for recycling. Multiple carts may be staged adjacent to the receiving area to receive the sorted and segregated recyclable commodities from other material types in the incoming mixed debris delivery(s). One or more carts may be dedicated to specific recyclable commodity types that may be present in the incoming mixed debris.

The resting position of the carts assures the carts remain stationary as the sorted recyclable materials are deposited therein. The debris stream can then be classified in a single sorting pass though the mixed debris in the receiving area and the sorted materials deposited directly into the adjacent carts with like recyclable commodity types until the entire mixed debris load deposited in the receiving area has been classified, sorted and segregated by commodity type in the adjacent carts.

As individual debris carts are filled, they may be moved from the receiving area and transported by a work vehicle to batch storage areas for the various recyclable commodity types. An empty cart can be positioned in the removed cart's place awaiting the next incoming load. Once rotated to a transport orientation by elevating the hitch connection end of the cart so that the cart is supported by the hitch connector and the wheels, the cart is moveable as a conventional wheeled trailer by the work vehicle. The filled cart may then be transported to a recyclable material commodity storage area. Once there, the cart may be parked with the sorted recyclable commodity materials, or the contents may be dumped into a bulk storage area for the recyclable commodity. Dumping is conveniently accomplished by elevating the hitch end of the cart using the elevating apparatus on the work vehicle with the hitch boom attached until the bottom panel is generally vertically oriented to the ground. Once the contents are emptied, the cart may be returned to its transport orientation and returned to the receiving area or staged around the yard area for other uses.

In a further aspect of the method, the debris carts may be utilized in a system 400 for receiving, classifying, sorting, and segregating mixed waste input into its constituent recyclable commodity portions and further maintaining an accounting of the waste input and the classified recyclable commodity output. A system 400 may be provided to automate the method.

Figure 8:
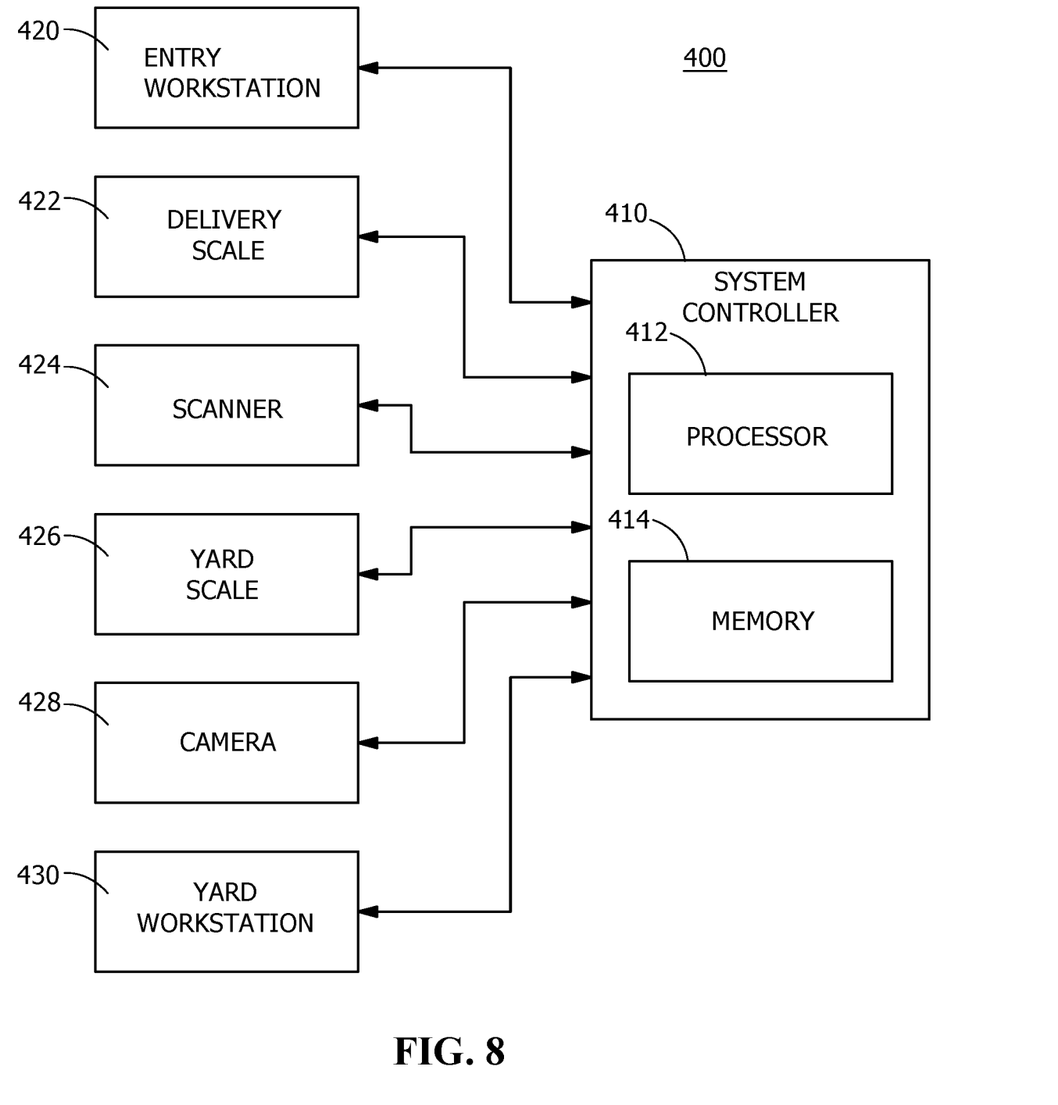
FIG. 8 illustrates a system for monitoring the process of receiving, sorting, classifying, and segregating recyclable commodities from a mixed waste stream and creating an accounting thereof.

It is contemplated that the system 400 can comprise a system controller 410 having at least one processor 412 and at least one memory 414 in communication with the at least one processor. Exemplary system controllers include computing devices as are known in the art, such as computers, workstations, smartphones, handheld computing devices, programmable logic controllers, and the like. Although shown in FIG. 8 as comprising a single processor 412 and a single memory 414, it is contemplated that the various components of the disclosed system 400 can comprise their own respective processors and/or memories that communicate with the processors and memories of other system components to function as a system controller. In further exemplary aspects, and as shown in FIG. 8, the system controller 410 can be communicatively coupled (optionally, wirelessly, such as over an Internet or cellular communication network) to various components of the system 400 to receive information and/or control the performance of the system.

The system controller can be communicatively coupled to an entry workstation 420 which may be used to input unique identifying information to be associated with a unique tracking number for the mixed waste delivery as the delivery load is received. Incoming deliveries of mixed waste materials may be associated with a unique tracking number signifying a customer account, job account, or other unique identifying information. The system controller may be communicatively coupled to a delivery scale 422 which may be used to determine the gross weight of the laden delivery vehicle upon entry. The gross weight may be associated with the unique tracking number for the delivery vehicle. Once so identified, the incoming mixed waste may be delivered to a dedicated material receiving area and off-loaded from the delivery vehicle. The dedicated receiving area is preferably assigned to isolate the mixed waste of the delivery vehicle from other contemporaneous incoming waste loads in the sorting, classifying, and segregation process by the recycling center. A tare weight of the delivery vehicle is obtained by the delivery scale 422 upon departure from the recycling center and associated with the tracking number so the net weight of the mixed waste stream can be determined and associated with the unique tracking number.

Debris carts may be staged adjacent to the dedicated receiving area to receive the sorted materials and segregate like-materials from other material types in the incoming mixed debris delivery. Each debris cart can be assigned a unique identifier and provided with indicia of the unique identifier. Exemplary forms of indicia include barcodes, radiofrequency identification (RFID) tags, sensors, and the like. In use, it is contemplated that these forms of indicia can be used to track the location of a particular cart 100 and provide the system controller 410 with the ability to associate information with the unique identifier of the cart.

The system controller can be communicatively coupled to remote scanner 424 to receive information regarding a first cart (such as location) as the cart is moved around the material recycling center. The system controller 410 can be communicatively coupled to yard scale 426 to receive information from the scale regarding the weight of a first cart. The system controller 410 can be communicatively coupled to camera 428 to receive images obtained by the camera of commodity type contained in the first cart. The system controller 410 can be communicatively coupled to a yard workstation 430 to receive information regarding the type of recyclable commodity contained in the first cart.

The methods can comprise transmitting information regarding the weight of the first cart to the system controller. The content weight of the first cart may be obtained by weighing the work vehicle and cart before and after the contents are unloaded in the recyclable material batch storage area or the nominal tare weight of the work vehicle and cart may be periodically supplied to the controller for later comparison to the gross laden weight. The method can further comprise using the system controller to associate the measured weight of the first cart with the unique identifier assigned to the cart. The methods can comprise producing an image of the cart and/or an image of the debris contained in the first cart and transmitting the image of the cart and/or the image of the debris to the system controller. The method can further comprise using the system controller to associate the image of the debris in the first cart with the unique identifier assigned to the first cart. The method can also comprise using the yard workstation to identify the type of recyclable materials contained in the first cart. The method may also comprise using the system controller to associate information identifying the type of recyclable materials contained in the first cart with the unique identifier assigned to the first cart.

The method comprises monitoring, weighing, and associating information for as many debris carts as are necessary to completely classify, sort, and segregate the mixed waste load delivered to the dedicated receiving area so that the entirety of the mixed waste load is accounted, and the information associated with the unique tracking number for the delivery.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A debris collection and transport cart comprising:
an open-top container defined by a bottom panel, with a wall extending upwardly from and encircling a periphery of the bottom panel and terminating in a top end, the wall further comprising a first end wall and a second end wall, the first and second end walls being opposingly disposed on the periphery;
a first hitch portion connected to an exterior surface of the first end wall;
a pair of spaced apart wheels connected to an exterior surface of the second end wall;
a boom having a proximal end adapted for connection to a work vehicle elevating apparatus and distal end having a second hitch portion selectively connectible to the first hitch portion;
the second end wall be outwardly angled relative to the bottom panel, an outer circumference of the pair of wheels being positioned adjacent to a horizontal surface when the bottom panel is supported by the horizontal surface, the outer circumference of the wheels being positioned adjacent to the horizontal surface when the top end of the second end wall is in contact with the horizontal surface and the bottom panel is vertically oriented, the cart being supported by the wheels in contact with the horizontal surface and the boom when the bottom panel is rotated from a horizontal orientation toward a vertical orientation as the boom is elevated by the work vehicle allowing the cart to be moved across the horizontal surface by the work vehicle.

2. The cart of claim 1, wherein the bottom panel is generally planar and rectangularly configured having a length and a width, and the wall further comprises first and second side walls opposingly disposed on the bottom panel periphery and extending between the first and second end walls.

3. The cart of claim 2, wherein the first hitch portion is laterally centered on the first end wall.

4. The cart of claim 3, wherein the boom has a length between the proximal end and the distal end of at least one half of the bottom panel width.

5. The cart of claim 1, wherein the first hitch portion is a pintle hitch loop and the second hitch portion is a pintle hitch hook.

6. The cart of claim 1, wherein the pair of wheels is spaced laterally symmetrically on the second end wall exterior surface.

7. The cart of claim 1, wherein the second end wall is outwardly angled from the bottom panel between 125 and 145 degrees.

8. A method for receiving, classifying and transporting recyclable debris comprising the steps of:
providing a plurality of debris carts, each of the plurality of debris carts further comprising:
a container defined by a bottom panel with a wall extending upwardly from and encircling a periphery of the bottom panel and terminating in a top end, the wall further comprising a first end wall and a second end wall, the first and second end walls being opposingly disposed on the periphery;
a first hitch portion connected to an exterior surface of the first end wall; and a pair of spaced apart wheels connected to an exterior surface of the second end wall;

the second end wall being outwardly angled relative to the bottom panel, an outer circumference of the pair of wheels being positioned adjacent to a ground surface when the bottom panel is supported by the ground surface, the outer circumference of the wheels being positioned adjacent to the ground surface when the top end of the second end wall is in contact with the ground surface and the bottom panel is vertically oriented, the cart being supported by the wheels in contact with the horizontal surface and the first hitch portion when the bottom panel is rotated from a horizontal orientation toward a vertical orientation;

positioning the plurality of debris carts adjacent to a material receiving area;

receiving recyclable materials into the material receiving area;

sorting and classifying into like materials the recyclable materials in the material receiving area;

segregating like recyclable materials by removing from the material receiving area and depositing into one of the plurality of debris carts designated for like recyclable materials;

providing a work vehicle with an elevating apparatus;

providing a boom having a proximal end adapted for connection to the work vehicle elevating apparatus and distal end having a second hitch portion configured for selective connection to the first hitch portion;

connecting the boom to the work vehicle;

connecting the second hitch portion to the first hitch portion of one of the plurality of debris carts at least partially filled with like recyclable materials and elevating the second hitch portion to a height at which the cart is supported by the wheels and the hitch;

removing from adjacent to the material receiving area the one of the plurality of debris carts at least partially filled with like recyclable materials; and transporting the one of the plurality of debris carts at least partially filled with like recyclable materials to a like material storage area.

9. The method of claim 8, further comprising the step of:
elevating by the work vehicle the boom to elevate the first hitch portion so that the bottom panel is rotated to a generally vertical orientation thereby emptying the container.

10. The method of claim 9, further comprising the step of:
transporting an empty debris cart to replace the one of the plurality of debris carts at least partially filled removed for emptying.

11. The method of claim 9, wherein the number of carts in the plurality of carts is at least equal to an anticipated number of unique recyclable material types anticipated in the material receiving area.

12. A method for receiving, classifying and transporting recyclable debris comprising the steps of:
receiving a delivery load of a mixed material debris and assigning a unique tracking number for the delivery load;
measuring a weight of the delivery load of mixed material debris and associating the weight with the unique tracking number;
placing the delivery load of mixed material debris in a designated receiving area;
providing a debris cart having a container defined by a bottom panel with a wall extending upwardly from and encircling a periphery of the bottom panel and terminating in a top end, the wall further comprising a first end wall and a second end wall, the first and second end walls being opposingly disposed on the periphery, the second end wall being outwardly angled relative to the bottom panel and having a pair of wheels outwardly disposed thereon, the first end wall having a hitch outwardly disposed thereon, the debris cart having a resting position defined as support of the debris cart by adjacent contact between the bottom panel and a ground surface, a transport position defined by elevating the hitch to rotate the bottom panel so that the container is suspended between the hitch and the wheels, and a dumping position defined by continued elevation of the hitch so that the bottom panel is generally vertical to the ground surface;

positioning the debris cart adjacent to the designated receiving area, the debris cart being assigned a unique identifier and provided with indicia of the unique identifier;

scanning the indicia wherein a system controller associates the unique identifier with the unique tracking number;

sorting the delivery load of mixed material debris, classifying into one or more types of recyclable commodities, and segregating a first type of recyclable commodities in the debris cart;

repositioning the debris cart containing the first type of recyclable commodities using a boom with a hitch elevated by a work vehicle elevating apparatus to rotate the debris cart to the transport position;

transporting the debris cart containing the first type of recyclable commodities from the dedicated receiving area;

scanning the indicia and weighing the debris cart containing the first type of recyclable commodities wherein the system controller associates a first weight of the first type of recyclable commodities with the unique tracking number;

transporting the debris cart containing the first type of recyclable commodities to a batch storage area for the first type of recyclable commodities; and repositioning the debris cart containing the first type of recyclable commodities using the boom connected to the work vehicle elevating apparatus to rotate the debris cart from the transport position to the dumping position thereby unloading the first type of recyclable commodities in the batch storage area.

13. The method of claim 12, wherein an outer circumference of the pair of wheels is positioned adjacent to the ground surface when the debris cart is in the resting position and the outer circumference of the wheels is positioned adjacent to the ground surface when the debris cart is in the dumping position.

14. The method of claim 13, further comprising the steps of:
repositioning the debris cart using the boom connected to the work vehicle elevating device to the transport position;
transporting the debris cart to the dedicated debris sorting area; and
repositioning the debris cart using the boom connected to the work vehicle elevating device to the resting position.

15. The method of claim 12, further comprising the step of:
creating an image of the first type of recyclable commodities contained in the debris transport cart wherein the system controller associates the image of the first type of recyclable commodities with the unique tracking number.

16. The method of claim 12, further comprising the step of:
assigning a commodity type to the first type of recyclable commodities contained in the debris transport cart using a yard workstation wherein the system controller associates the commodity type of the first type of recyclable commodities with the unique tracking number.

17. The method of claim 16, further comprising a scanner and a scale communicatively coupled to the system controller.

18. The method of claim 12, wherein the system controller comprises at least one processor and at least one memory in communication with the at least one processor.

\* \* \* \* \*